United States Patent
Goto et al.

(10) Patent No.: US 6,696,391 B2
(45) Date of Patent: Feb. 24, 2004

(54) COATING AGENT FOR WIPER BLADE RUBBER, AND WIPER BLADE RUBBER WITH THE SAME

(75) Inventors: Shinya Goto, Anjo (JP); Naoki Torii, Toyohashi (JP); Hiroaki Ohsako, Ageo (JP); Kouitsu Itoh, Odawara (JP)

(73) Assignees: Denso Corporation, Kariya (JP); ASMO Co. Ltd., Kosai (JP)

( * ) Notice: Subject to any disclaimer, the term of this patent is extended or adjusted under 35 U.S.C. 154(b) by 0 days.

(21) Appl. No.: 09/898,464

(22) Filed: Jul. 5, 2001

(65) Prior Publication Data
US 2003/0087767 A1 May 8, 2003

(30) Foreign Application Priority Data
Jul. 5, 2001 (JP) ......................................... 2000-241889

(51) Int. Cl.[7] .......................... C10M 125/02; B60S 1/04
(52) U.S. Cl. ................ 508/113; 15/250.001; 15/250.36; 428/325; 428/336
(58) Field of Search ................... 508/109, 113; 15/250.001, 250.361; 428/325, 336

(56) References Cited

U.S. PATENT DOCUMENTS

| | | | |
|---|---|---|---|
| 3,882,567 A | 5/1975 | Herzog | |
| 4,045,838 A | 9/1977 | Porter | |
| 4,103,385 A * | 8/1978 | Porter | ........................ 264/129 |
| 4,853,428 A * | 8/1989 | Theodore et al. | ............ 524/491 |
| 4,912,803 A * | 4/1990 | Yasukawa et al. | ........... 428/336 |
| 5,376,454 A * | 12/1994 | Sugasawa et al. | ........... 428/421 |
| 5,883,168 A | 3/1999 | Oulie | |
| 6,311,364 B1 * | 11/2001 | Reo | ........................... 428/325 |

FOREIGN PATENT DOCUMENTS

| | | |
|---|---|---|
| EP | 0 562 191 | 9/1993 |
| EP | 0 812 875 | 12/1997 |
| FR | 76 38549 | 10/1977 |
| JP | 52-111135 | 9/1977 |
| JP | 57-30646 | 2/1982 |
| JP | 63-121169 | 8/1988 |
| JP | 03042355 * | 7/1989 |
| JP | 3-42355 | 2/1991 |
| JP | 09-183867 | 7/1997 |
| JP | 09-296136 | 11/1997 |
| JP | 2785571 * | 8/1998 |
| JP | 11-034809 | 2/1999 |

OTHER PUBLICATIONS

Patent Abstracts of Japan, Publication No. 10–001640 dated 1/1998.

* cited by examiner

Primary Examiner—Jacqueline V. Howard
(74) Attorney, Agent, or Firm—Harness, Dickey & Pierce, PLC

(57) ABSTRACT

A wiper blade rubber having a coating film on both surfaces of the lip part, the coating film comprising a particulate solid lubricant and a binder and the binder having a 0.5% modulus of 1 MPa or more and an elongation to break of 1% or more.

37 Claims, 4 Drawing Sheets

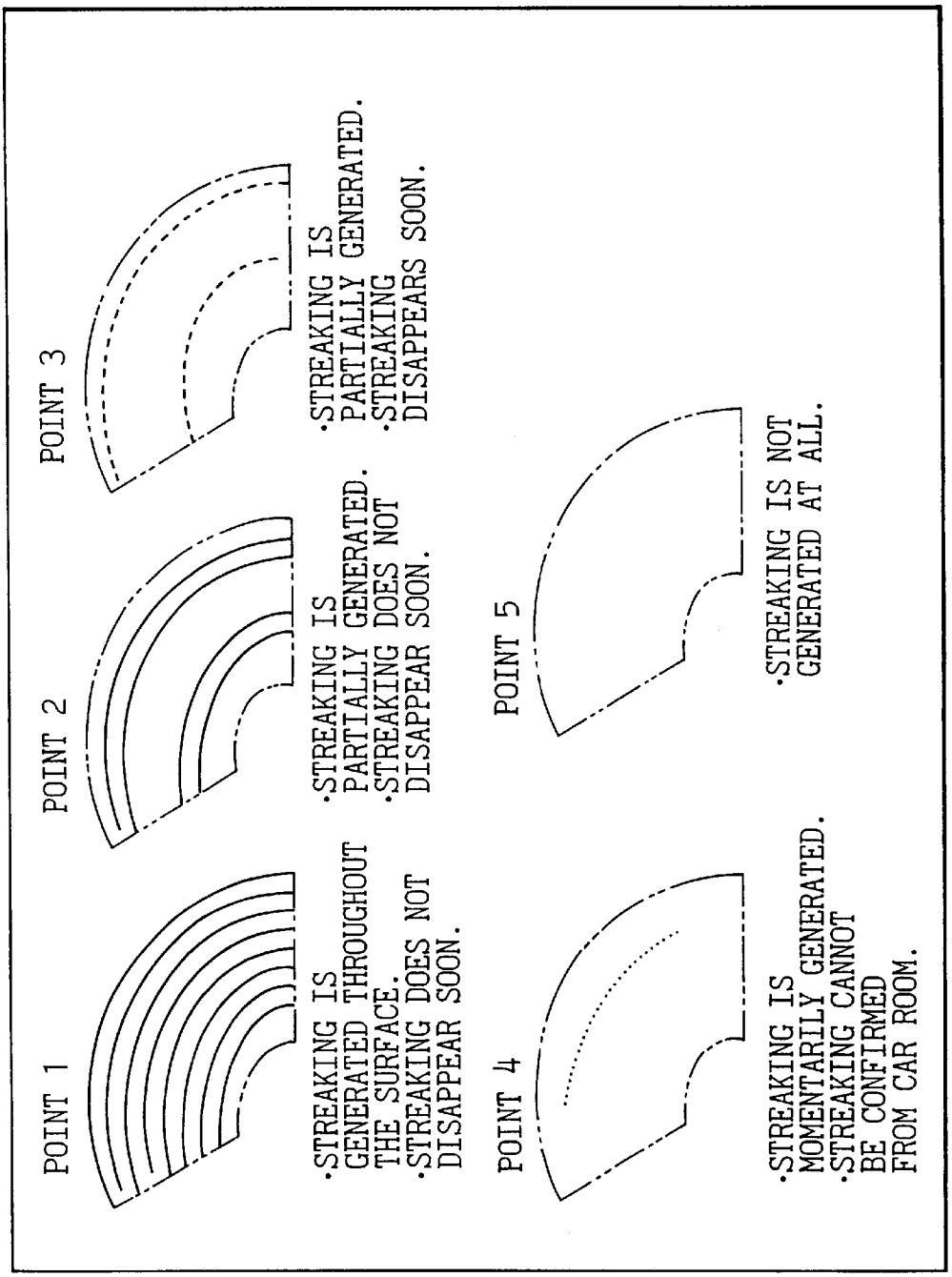

COATING AGENT FOR WIPER BLADE RUBBER, AND WIPER BLADE RUBBER WITH THE SAME

BACKGROUND OF THE INVENTION

1. Technical Field of the Invention

The present invention relates to a wiper blade rubber for use in vehicles and the like and also relates to a coating agent coated on this wiper blade rubber.

2. Description of the Related Art

The wiper blade rubber is subjected to a surface treatment with chlorine so as to reduce the frictional resistance in wiping and improve the abrasion property at the distal end of the lip part which comes into contact with glass. This chlorine treatment comprises dipping at least the lip part of a wiper blade rubber in a chlorine-based solvent to harden the surface. When a wiper blade rubber treated with chlorine is operated in the water-wetted state on a glass surface subjected to a water-repellent treatment, chattering is generated. Furthermore, after the wiper is operated 100,000 times, a large number of streaks remain in the sensuous evaluation of the wiping property.

In order to ensure good visual field from a motor car or the like, the glass is sometimes subjected to a water-repellent treatment. According to the studies by the present inventors, this treatment has been confirmed to cause a problem in that the glass subjected to a water-repellent treatment repels water in a ball form and therefore, residual streaks and the like are not easily generated, however, since a water film is difficult to form, the glass and the rubber are liable to come into direct contact and even in the wet condition, the coefficient of friction particularly during the low-speed operation increases to be comparable with the coefficient of static friction in the dry condition and in turn, the coefficient of static friction in the wet condition becomes excessively large in comparison with the case of clean glass, as a result, the velocity dependence of the friction coefficient increases, so that a chattering (noise) is readily generated.

Even on a glass surface not subjected to a water-repellent treatment, when wax or the like is applied, chattering is sometimes readily generated because a water film is difficult to form. Also, the wiper blade rubber generates remaining streaks or uneven wiping, due to abrasion on use for a long period of time or due to mesh-geared sand, which inhibits the visual field.

Furthermore, with a long-term use, even a glass subjected to a water-repellent treatment undergoes partial loss of the water-repellent treatment and the glass substrate is exposed. Accordingly, the wiper blade rubber must have a good wiping performance and high noise-preventing effect for both a glass subjected to a water-repellent treatment and a clean glass.

By taking account of these problems, the object of the present invention is to provide a wiper blade rubber capable of exhibiting good wiping performance and high noise-preventing effect for both a glass subjected to a water-repellent treatment and a clean glass.

SUMMARY OF THE INVENTION

As a result of extensive investigations to achieve the above-described object, it has been found that this object can be attained by providing the following and the present invention has been accomplished based on this finding.

(1) A coating agent for wiper blade rubbers, comprising a particulate solid lubricant and a binder for sticking the solid lubricant to a wiper blade rubber, wherein the binder has a 0.5% modulus (substitute for an elastic modulus) of about 1 MPa or more and an elongation to break of about 1% or more after drying or curing.

(2) The coating agent for wiper blade rubbers as described in (1), wherein the volume ratio of the solid lubricant to the binder is from about 0.25 to about 1.0.

(3) The coating agent for wiper blade rubbers as described in (1), wherein the volume ratio of the solid lubricant to the binder is from about 0.4 to about 0.7.

(4) The coating agent for wiper blade rubbers as described in (1) to (3), wherein the solid lubricant is graphite particles.

(5) The coating agent for wiper blade rubbers as described In (1) to (4), wherein the binder is selected from the group consisting of urethane resins, polyamideimides resin and epoxy resins.

(6) The coating agent for wiper blade rubbers as described in (1) to (5), wherein the binder has a 0.5% modulus of about 4 MPa or more and an elongation to break of about 2% or more after drying or curing (7) A wiper blade rubber having a coating film on both surfaces of a lip part thereof, the coating film comprising a particulate solid lubricant and a binder and the binder having a 0.5% modulus of about 1 MPa or more and an elongation to break of about 1% or more.

(8) The wiper blade rubber as described in (7), which is produced by a method comprising applying a coating agent on both surfaces of the lip part of a tandem-shaped wiper blade rubber, drying or curing the coating agent and cutting the distal end of the lip part to form coating films terminating on the lateral surface of the lip part.

(9) The wiper blade rubber as described in (7) and (8), wherein the coating film has a thickness of about 2 to about 10 $\mu$m.

(10) The wiper blade rubber as described in (7) to (9), wherein when the terminal voltage of a motor for driving the wiper blade rubber is 7 V, the coefficient of static friction with a glass subjected to a water-repellent treatment is about 0.65 or less.

(11) The wiper blade rubber as described in (7) to (10), wherein the volume ratio of the solid lubricant to the binder is from about 0.25 to about 1.0.

(12) The wiper blade rubber as described in (7) to (10), wherein the volume ratio of the solid lubricant to the binder is from about 0.4 to about 0.7.

(13) The wiper blade rubber as described in (7) to (12), wherein the solid lubricant comprises graphite particles.

(14) The wiper blade rubber as described in (7) to (13), wherein the binder is selected from the group consisting of urethane resins, polyamideimide resins and epoxy resins.

(15) The wiper blade rubber as described in (7) to (14), wherein the binder has a 0.5% modulus of about 4 MPa or more and an elongation to break of about 2% or more after drying or curing.

(16) A method for producing a wiper blade rubber, comprising applying a coating agent on both surfaces of the lip part of a tandem-shaped wiper blade rubber, drying or curing the coating agent and cutting the distal end of the lip part to form coating films terminating on the lateral surface of the lip part, wherein the coating agent comprises a particulate solid lubricant and a binder and the binder has a 0.5% modulus of about 1 MPa or more and an elongation to break of about 1% or more after drying or curing.

(17) The method as described in (16), wherein the step of drying or curing the coating agent is a step of heat-treating the coating agent under conditions not more severe than about 120° C. and about 30 minutes.

BRIEF DESCRIPTION OF THE DRAWINGS

FIG. 7 is a view showing the standard for the point number in the sensuous evaluation of wiping of FIG. 5.

DETAILED DESCRIPTION OF THE INVENTION

Figure 1:
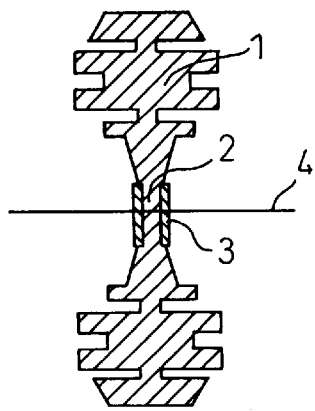
FIG. 1 is a cross-sectional view of a wire blade rubber having a tandem-shaped coating film used in the Mode for Carrying out the Invention and in the Examples.

A wiper blade rubber capable of exhibiting good wiping performance and high noise-preventing effect for a clean glass is known, which is designed by taking account of the balance among vibration absorption, low-temperature property, heat resistance, abrasion resistance, ozone resistance and the like. Such a wiper blade rubber is constructed, for example, by natural rubber, chloroprane, a blend of natural rubber and chloroprane, ethylene propylene rubber, silicone rubber, and so on In the present invention, any of these known wiper blade rubbers and the improved wiper blade rubbers can be used as a wiper blade rubber body. In the present invention, the friction is reduced by a surface modification method of coating the wiper blade rubber so as to prevent the wiping failure and the generation of noise on a water-repellent glass and improve wiping performance and noise preventing effect on a clean glass, so that a vibration absorption, low temperature property, heat resistance, ozone resistance, and the like, attributable to the characteristic features of the wiper blade rubber body can be maintained.

According to the present invention, a coating agent containing a particulate solid lubricant and a binder is coated on both surfaces of the lip part of a wiper blade rubber and then dried and/or cured to reduce the friction of the wiper blade rubber. The reduction in the coefficient of friction with a glass is mainly affected by the kind of the particulate solid lubricant, the kind of the binder and the blending ratio therebetween. The preferred solid lubricant is, but is not limited to, graphite. Particularly, scaly graphite is preferred because of its smaller coefficient of friction. In addition, polytetrafluoroethylene (emulsion polymerized particles are more preferred than suspension polymerized particles) and molybdenum disulfide may be used. Although particle size of the solid lubricant has a small effect, the particle size is set to be smaller than the thickness of the coating because the coefficient of friction is liable to be smaller as the particle size is smaller and also, the particles may drop in higher probability as the particle size is larger. In general, the thickness of the coating film is preferably from 2 to 10 $\mu m$ and therefore, the particle size of the solid lubricant is preferably smaller than the thickness of the coating. If the particle size of the particulate solid lubricant exceeds 10 $\mu m$, the coating surface may be roughened to cause wiping failure on a clean glass.

The binder of the coating agent must have a 0.5% modulus of 1 MPa or more and an elongation to break of 1% or more after the drying or curing. Since the coating can be regarded as the lip of a wiper and the coefficient of friction during the abrasive operation is in inverse proportion to the elastic modulus, the 0.5% modulus (an elastic modulus) must be 1 MPa or more for obtaining a desired low coefficient of friction. If the elastic modulus is less than 1 MPa, the wiper blade rubber cannot have a sufficiently low coefficient of friction. The 0.5% modulus is preferably 4 MPa or more. However, it the elongation to break is less than 1%, the coating may be cracked and stripped upon cutting the distal end of the lip part after coating and drying or curing the coating agent or upon use. Therefore, the elongation to break must be 1% or more. The elongation to break is preferably 2% or more.

The resin capable of satisfying these properties as the binder is, but not particularly limited to, preferably a urethane resin, a polyamideimide resin or an epoxy resin.

The blending ratio of the solid lubricant to the binder (hereinafter referred to as a "P/B ratio") is, in terms of a volume ratio, preferably from 0.25 to 1.0, more preferably from 0.4 to 0.7. If the amount of the solid lubricant is excessively large, desorption of particles readily occurs, whereas if the amount of the solid lubricant is small, the coefficient of friction is not sufficiently decreased and chattering (noise) is easily generated.

The thickness of the coating film is preferably from 2 to 10 $\mu m$. If the thickness is less than 2 $\mu m$, the obtained wiper blade rubber is disadvantageously large in the coefficient of friction with glass, whereas if it exceeds 10 $\mu m$, the wiping failure occurs.

If desired, an appropriate solvent may be used The coating agent of the present invention contains a particulate binder and a particulate solid lubricant and usually, the solid contents comprising these binder and solid lubricant are dissolved in a solvent before use. The amount of the solvent used, based on the solid contents, varies depending on the use method of the prepared coating agent and cannot be specifically limited but the solvent is usually used in an amount of 150 to 1,200 parts by mass per 100 parts by mass of the solid portion.

The wiper blade rubber can be produced by a method comprising applying a coating agent on both surfaces of the lip part of a wiper blade rubber, drying or curing this coating agent and cutting the distal end of the lip part to form a coating film terminating on the lateral surface of the lip part.

The wiper blade rubber before the cutting preferably has a tandem shape. By having this shape, clear cutting of the distal end of the lip part is facilitated and a wiper blade rubber having a lip part attached with a coating film can be produced with good profitability.

The heat-treatment of drying or curing this coating agent is preferably performed under conditions not more severe than 120° C. and 30 minutes. If the heat-treatment conditions are more severe than this, although it may vary depending on the construction material of the wiper blade rubber body, the wiper blade rubber body may be deteriorated to reduce the capability of wiping a clean glass or of preventing noises.

FIG. 1 is a view showing an example of coating the lip part of a wiper blade using this coating agent. As shown in FIG. 1, a coating agent 3 is coated, by spraying, on both surfaces of the lip part 2 of a wiper blade rubber 1 and then dried or cured to form a coating film. The wiper blade rubber is cut at the center of the lip part 2 to prepare wiper blade rubbers having coating films on the lip part. The numeral 4 shows the cutting face.

EXAMPLES

A coating agent for a wiper blade rubber stepwise different in the elastic modulus (modulus) was prepared using graphite having a particle size of 4 to 6 μm and binders (a) to (g) shown below at a P/B ratio of 0.5 which is an effective blending ratio of graphite to binder for preventing powder dropping and reducing the friction (a) polyol polyether-based urethane/aromatic isocyanate (100 parts by mass of "Nippolan 3016" (a trademark, produced by Nippon Polyurethane Industry Co., Ltd.)/5 parts by mass of "Colonate L" (a trademark, produced by Nippon Polyurethane Industry Co., Ltd., a curing agent));

(b) a copolymer of tetrafluoroethylene, hexafluoropropylene and vinylidene fluoride ("THV200P, a trade name, produced by Sumitomo 3M);

(c) silicon-modified urethane polyol/isophorone diisocyanate (100 parts by mass of "Takelac TE-520" (a trademark, produced by Takeda Chemical Industries, Ltd.)/33 parts by mass of "Takenate D-140N" (a trademark, produced by Takeda Chemical Industries, Ltd., a curing agent));

(d) BPA-type liquid epoxy/aromatic polyamide (100 parts by mass of "Adecaresin EP-4100" (a trademark, produced by Asahi Denka Kogyo K.K.)/60 parts by mass of "Adecahardener EH-540" (a trademark, produced by Asahi Denka Kogyo K.K., a curing agent));

(e) polyamideimide ("HPC-5000-37" (a trademark, produced by Hitachi Chemical Co., Ltd.));

(f) polyol polyether-based urethane/block isocyanate (100 parts by mass of "Nippolan 179" (a trademark, produced by Nippon Polyurethane Industry Co., Ltd.)/124 parts by weight of "Colonate 2513" (a trademark, produced by Nippon Polyurethane Industry Co., Ltd., a curing agent)); and (g) acryl ("Acrydic 56-1155" (a trademark, produced by Dainippon Ink and Chemicals, Inc.)).

The coating agent was prepared as follows. An organic solvent was selected according to the binder and charged into a vessel and the binder was mixed and dissolved using a stirrer. To the resulting solution, graphite was added little by little and uniformly stirred until coarse grains disappeared, thereby obtaining a coating agent. In the case of using a curing agent, a predetermined amount of a curing agent was added to the coating agent immediately before the coating on a wiper blade and thoroughly mixed.

The thus-obtained wiper blade having a coating film on the lip part was determined on the coefficient of static friction with a water-repellent glass. The coefficient of static friction was determined by pressing a 10 cm-length wiper blade rubber sample to a glass surface under a load P of 1.67 N (170 gf), varying the relative speed between the glass surface and the wiper blade rubber sample in the range from 0 to 2 m/s and measuring the load F of the sample rubbing the glass surface using a strain gauge. The water-repellant glass used was obtained by coating a two liquid-system coating agent, i.e., first a first agent comprising a fluorine-containing silicone and 90% of isopropyl alcohol on a clear glass and then a second agent (a finishing agent) comprising 85% of ethyl alcohol. The ambient temperature during the determination was room temperature. From the value obtained by this determination, a coefficient of friction was calculated according to $\mu = P/F$.

Figure 2:
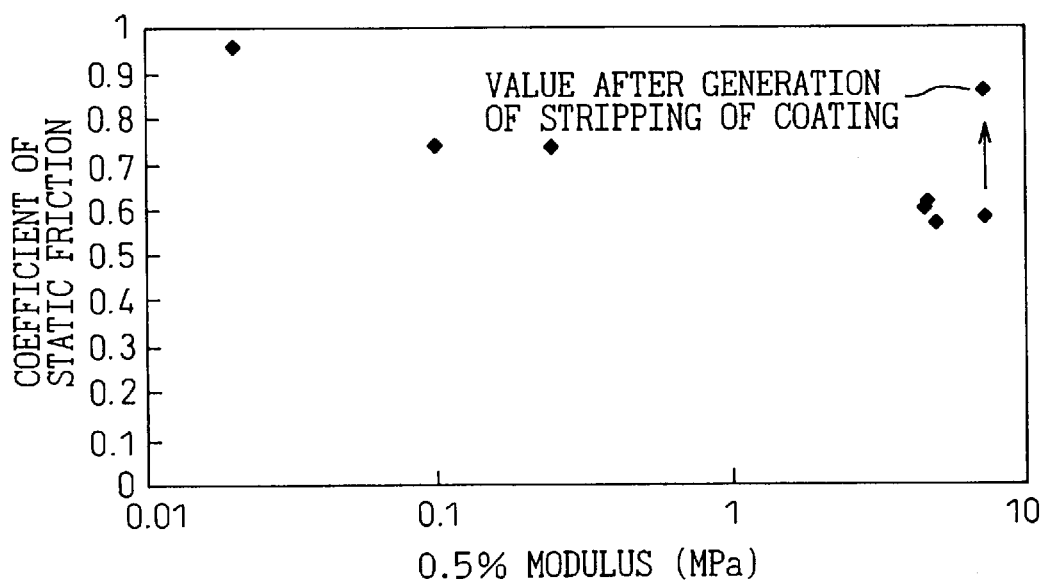
FIG. 2 is a graph showing the relationship between the modulus at the elongation of 0.5% and the coefficient of static friction of various binders.

The binders (a) to (g) each was determined on the stress-strain (S-S) curve by processing the binder into a strip having a thickness of 30 to 150 μm and a width of 10 mm and pulling it at a tensile speed of 10 mm/min. The modulus at an elongation of 0.5% on the curve was used as the standard for the elastic modulus and the relationships between the modulus at the elongation of 0.5% and the coefficient of static friction are shown in Table 1 and FIG. 2. In FIG. 2, the 0.5 modulus is logarithmically indicated.

TABLE 1

| Kind of Binder | Modulus at 0.5% Elongation | Coefficient of Static Friction |
|---|---|---|
| a | 0.02 MPa | 0.96 |
| b | 0.10 MPa | 0.74 |
| c | 0.25 MPa | 0.73 |
| d | 4.58 MPa | 0.60 |
| e | 4.67 MPa | 0.62 |
| f | 5.00 MPa | 0.56 |
| g | 7.22 MPa | 0.58 (0.88) |

Note)
The value "0.88" of the binder (g) is a value after stripping of the coating was generated.

It is seen from FIG. 2 plotting the 0.5% modulus of dried or cured product of the binder on a logarithmic axis, that as the modulus is larger, the coefficient of static friction is smaller and also that with a modulus of 1 MPa or more, the coefficient of static friction became 0.65 or less. Separately, It was confirmed that with a coefficient of static friction of 0.65 or less, the wiper blade rubber operating on a water-repellent glass scarcely generates chattering even when the driving speed is low (even when the terminal voltage of the wiper driving motor is low).

Thereafter, the dried or cured product of each binder was determined on the elongation to break (%) and after coating and then drying or curing a coating agent using each binder, the relationship between the elongation to break and cracking (which causes the generation of stripping of the coating) on cutting the distal end of the lip part was examined.

The results obtained are shown in Table 2. It is seen from Table 2 that at an elongation to break of 0.8%, the coating may cause cracking due to the effect of film thickness or the cutting blade.

TABLE 2

| Binder | Elongation at Break (%) | Presence or Absence of Cracking |
|---|---|---|
| a | 554 | none |
| b | 948 | none |
| c | 141 | none |
| d | 4.8 | none |
| e | 7.0 | none |
| f | 3.1 | none |
| g | 0.8 | sometimes cracked |

The binders (a) to (g), the compositions of coating agents for wire blade prepared using respective binders, and the corresponding Example or Comparative Example are shown below.

TABLE 3

| Binder | Binder Name of Product | Parts by Mass | Binder (Curing agent) Name of Product | Parts by Mass | Solid Lubricant | Parts by Mass | P/B Ratio | Solvent | Parts by Mass | | Parts by Mass | | Parts by Mass | parts by mass | Corresponding Example or Comparative Example |
|---|---|---|---|---|---|---|---|---|---|---|---|---|---|---|---|
| a | Nippolan 3016 | 31.0 | Colonate L | 1.56 | scaly graphite | 8.0 | 0.5 | cellosolve acetate | 61.0 | — | — | — | — | — | Comparative Example 2 |
| c | Takelac TE-520 | 9.42 | Takenate D-140 | 3.14 | scaly graphite | 8.0 | 0.5 | N,N-dimethyl-acetamide | 10.0 | xylene | 15.0 | methyl ethyl ketone | 54.44 | | Comparative Example 3 |
| f | Nippolan 179 | 4.9 | Colonate 2513 | 6.1 | scaly graphite | 8.0 | 0.5 | N,N-dimethyl-acetamide | 10.0 | xylene | 15.0 | methyl ethyl ketone | 56.0 | | Example 1 |
| b | THV-200P | 8.0 | — | — | scaly graphite | 8.0 | 0.5 | — | — | xylene | 50.0 | methyl ethyl ketone | 134.0 | | — |
| d | Adeca-resin EP-4100 | 5.0 | Adeca-hardener EH-540 | 3.0 | scaly graphite | 8.0 | 0.5 | cellosolve acetate | 25.5 | xylene | 33.3 | n-butanol | 25.2 | | Example 3 |
| e | HPC-5000-37 | 21.62 | — | — | scaly graphite | 8.0 | 0.5 | N,N-dimethyl-acetamide | 70.38 | — | — | — | — | | Example 3 |
| g | Acrydic 56-1155 | 18.0 | — | — | scaly graphite | 8.0 | 0.5 | tetra-hydro-furan | 10.0 | xylene | 40.0 | toluene | 24.0 | | — |

Example 1

A tandem-shaped body having attached thereto two wiper blade rubbers (material: a blend of natural rubber/chloroprene) shown in FIG. 1 was mold-processed. This tandem-shaped body was dipped in a treating solution to treat the surface with chlorine and then washed under boiling water. Thereafter, a coating agent was applied by a spray gun mainly to the lip part in one side and after reversing this wiper blade rubber, applied also to the opposite side, followed by baking in an oven. The baked body was cut at the center of the lip part and separated into two wiper blade rubbers.

The coating agent used above was prepared using 8.0 wt % of scaly graphite ("UF-2", a trade name, produced by SKW East Asia K.K.) an the solid lubricant and 11.0 wt % of polyol polyether-based urethane/block isocyanate (comprising 100 parts by mass of "Nippolan 3016", a trade name, and 15 parts by mass of "Colonate 2513", a trade name, both produced by Nippon Polyurethane Industry Co., Ltd.) as the binder at a P/B ratio of 0.5 by charging these together with 56.0 wt % of methyl ethyl ketone, 15.0 wt % of xylene and 10.0 wt % of N-dimethylacetamide as solvents in a vessel and stirring the mixture until a uniform solution was obtained.

Example 2

A coating solution prepared in the same manner as in Example 1, except for changing the binder to polyamide-imide and the main solvent to N,N-dimethylacetamide, and was coated.

Example 3

A coating solution prepared in the same manner as in Example 1, except for changing the binder to bisphenol A (BPA)-type liquid epoxy/aromatic polyamide and the main solvent to cellosolve acetate, was coated.

Comparative Example 1

The procedure until the tandem-shaped body was chlorinated in Example 1 was performed and without applying a coating agent, the tandem-shaped body was cut at the center to manufacture wiper blade rubbers.

Comparative Example 2

A coating solution prepared in the same manner as in Example 1, except for changing the binder to polyol polyether-based urethane/aromatic isocyanate and the main solvent to cellosolve acetate, was coated.

Comparative Example 3

A coating solution prepared in the same manner as in Example 1, except for changing the binder to silicon-modified urethane polyol/isophorone diisocyanate, was coated.

Figure 3:
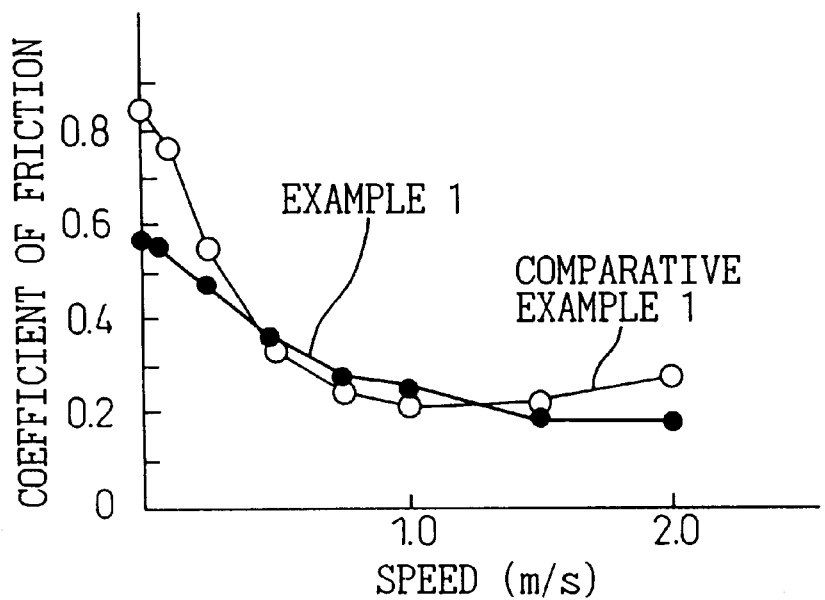
FIG. 3 is a graph showing the relationship between the transfer speed and the coefficient of friction on a water-repellent glass, of wiper blade rubbers of Example 1 and Comparative Example 1.

The relationship between the wiper blade rubber speed and the coefficient of friction on a water-repellent glass surface, of wiper blade rubbers obtained in Example 1 and Comparative Example 1 is shown in FIG. 3. The motor terminal voltage and the chattering state in Examples 1 to 3 and Comparative Examples 1 to 3 are shown in Table 4. In Table 4, the presence or absence of chattering was examined by reducing the motor terminal voltage to 6 V which is a working limit of the wiper.

TABLE 4

| | Motor Terminal Voltage (V) | | | | | | | | |
|---|---|---|---|---|---|---|---|---|---|
| Sample | 14 | 13 | 12 | 11 | 10 | 9 | 8 | 7 | 6 |
| Example 1 | ○ | ○ | ○ | ○ | ○ | ○ | ○ | ○ | ○ |
| Example 2 | ○ | ○ | ○ | ○ | ○ | ○ | ○ | ○ | ○ |
| Example 3 | ○ | ○ | ○ | ○ | ○ | ○ | ○ | ○ | ○ |
| Comparative Example 1 | ○ | ○ | ○ | x | x | x | x | x | x |
| Comparative Example 2 | ○ | ○ | x | x | x | x | x | x | x |
| Comparative Example 3 | ○ | ○ | ○ | ○ | ○ | x | x | x | x |

○: Chattering was not generated.
x. Chattering was generated.

As seen in Table 4, the wiper blade rubbers of Examples 1 to 3 generated no chattering even when the motor terminal voltage was reduced to 6 V which is a working limit of the wiper. The wiper blade rubbers of Examples 1 to 3 each had an elastic modulus (0.5% modulus) and an elongation to break shown below.

|  | 0.5% modulus | Elongation to Break |
| --- | --- | --- |
| Example 1: | 5.00 MPa | 3.1% |
| Example 2: | 4.67 MPa | 7.0% |
| Example 3: | 4.58 MPa | 4.8% |
| Comparative Example 1: | — | — |
| Comparative Example 2: | 0.02 MPa | 554% |
| Comparative Example 3: | 0.25 MPa | 948% |

Figure 5:
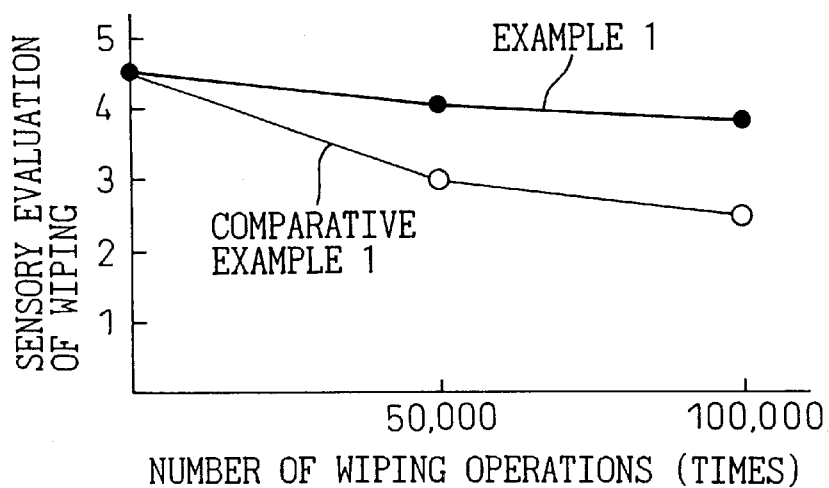
FIG. 5 is a graph showing the relationship between the number of wiping operations and the sensory evaluation point on a clean glass not subjected to a water-repellent treatment.
Figure 6:
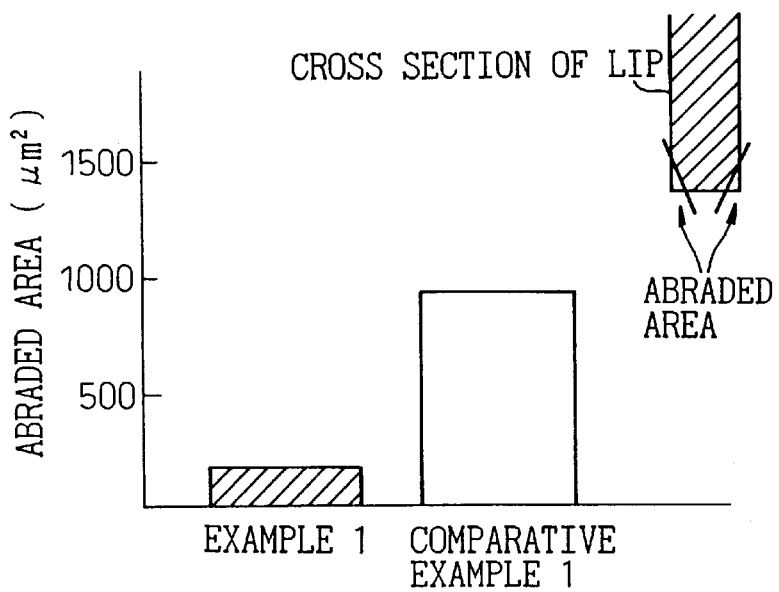
FIG. 6 is a graph showing the abraded area ($\mu m^2$) is when a clean glass not subjected to a water-repellent treatment is wiped 100,000 times in Example 1 and Comparative Example 1.

Using a clean glass surface not subjected to a water-repellent treatment, the wire blade rubbers obtained in Example 1 and Comparative Example 1 were examined on the relationship between the wiper blade rubber speed and the coefficient of friction (FIG. 4), the chattering state while changing the terminal voltage of a motor for driving the wiper blade rubber (Table 5), the sensory evaluation of the durability (wiping) in 100,000 wiping operations (FIG. 5), and the durability (abrasion) in 100,000 wiping operations (FIG. 6). The results obtained are shown in FIG. 4, Table 5, FIG. 5 and FIG. 6.

Figure 4:
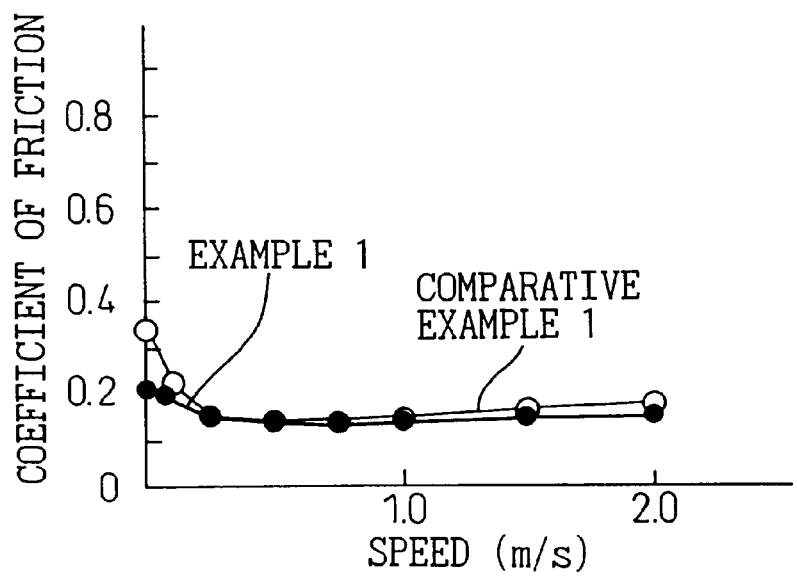
FIG. 4 is a graph showing the relationship between the transfer speed and the coefficient of friction on a glass not subjected to a water-repellent treatment, of wiper blade rubbers of Example 1 and Comparative Example 1.

The coefficient of static friction shown in FIG. 4 was measured in the same manner as in the method for measuring the coefficient of static friction described above except for changing the relative speed between the glass surface and the wiper blade rubber. The point number (from point 1 to point 5) in the sensory evaluation of wiping shown in FIG. 5 was evaluated based on the criteria shown in FIG. 7. The durability (abrasion) in 100,000 wiping operations shown in the graph of FIG. 6 is an abraded area at the lip distal end of the wiper blade rubber shown in FIG. 6 after enduring 100,000 wiping operations.

TABLE 5

| | Motor Terminal Voltage (V) | | | | | | | | |
| --- | --- | --- | --- | --- | --- | --- | --- | --- | --- |
| Sample | 14 | 13 | 12 | 11 | 10 | 9 | 8 | 7 | 6 |
| Example 1 | ○ | ○ | ○ | ○ | ○ | ○ | ○ | ○ | ○ |
| Comparative Example 1 | ○ | ○ | ○ | ○ | ○ | ○ | x | x | x |

○: Chattering was not generated.
x: Chattering was generated.

On comparing FIG. 4 and FIG. 3, it is seen that, in the case of a clean glass, the coefficient of friction in the wet state is low on the whole independently of the wiper blade rubber speed and in the case of a water-repellent glass, despite the wet state, as the wiper blade rubber speed is lower, the coefficient of friction is higher. In particular, the wiper blade rubber for comparison in Comparative Example 1 is revealed to undergo extreme increase in the coefficient of friction. As such, it is verified that the coefficient of friction on a water-repellent glass becomes extremely high when the wiper blade rubber speed is low (the terminal voltage of a motor for driving the wiper blade rubber is low), and this is a cause of chattering (noise). On the other hand, in Example 1 of the present invention, even when the wiper blade rubber speed is low (the terminal voltage of a motor for driving the wiper blade rubber is low), the coefficient of friction with a water-repellent glass can be sufficiently decreased as compared with Comparative Example 1 (no coating), and the velocity dependence of the friction coefficient increases so that the chattering can be prevented from occurring. It was experimentally confirmed that insofar as this static coefficient of friction is 6.5 or less, the chattering can be prevented even when the wiper blade rubber speed is low (the terminal voltage of a motor for driving the wiper blade rubber is low). Referring again to FIG. 2, it is seen that when a coating having a 0.5% modulus of 1 MPa or more, preferably 4 MPa or more, necessary for giving a coefficient of static friction of 6.5 or less is formed at the lip distal end of a wiper blade rubber, chattering can be prevented even on a water-repellent glass. Furthermore, it is seen from Table 5 that in Comparative Example 1, chattering is generated when the terminal voltage of the motor for driving the wiper blade rubber is decreased to 8 V, whereas in Example 1, even when the motor terminal voltage is decreased to 6 V, chattering is not generated.

Also, it is seen from FIG. 5 that, in Comparative Example 1 (no coating), the wiper blade rubber is reduced in the wiping performance at a durability test, whereas in Example 1, reduction in the wiping performance is remarkably suppressed even in the durability test of 100,000 wiping operations. Furthermore, as seen in FIG. 6, the wiper blade rubber of Comparative Example 1 undergoes vigorous abrasion (900 $\mu m^2$ or more), whereas in Example 1, abrasion of the wiper blade rubber is greatly reduced (200 $\mu m^2$). In other words, the wiper blade rubber of Comparative Example 1 is abraded and generates wiping unevenness, whereas the wiper blade of Example 1 is prevented from abrasion and therefore, uniform wiping performance is maintained even after long use.

As such, according to the present invention, the wiper blade rubber can have low friction and therefore, the chattering can be greatly prevented. Even with a low motor terminal voltage, if chattering is not generated, the wiper blade arm can be made less rigid, as a result, the motor may be minimized, the bush for preventing chattering may be dispensed with and the cost for wiper system may be greatly reduced. In addition, remarkably low abrasion of the wiper blade rubber can be achieved.

What is claimed is:

1. A coating agent for a rubber blade to form a portion of the rubber blade which contacts a glass surface to be wiped, the coating agent comprising a particulate solid lubricant and a binder for sticking said solid lubricant to a wiper blade rubber, wherein said binder has a 0.5% modulus of 1 MPa or more and an elongation to break of 1% or more after drying or curing.

2. The coating agent as claimed in claim 1, wherein the volume ratio of said solid lubricant to said binder is from 0.25 to 1.0.

3. The coating agent as claimed in claim 1, wherein the volume ratio of said solid lubricant to said binder is from 0.4 to 0.7.

4. The coating agent as claimed in claim 1, wherein said solid lubricant is a graphite particle.

5. The coating agent as claimed in claim 1, wherein said binder is selected from the group consisting of urethane resins, polyamideimide resins and epoxy resins.

6. The coating agent as claimed in claim 1, wherein said binder has a 0.5% modulus of 4 MPa or more and an elongation to break of 2% or more after drying or curing.

7. The coating agent according to claim 1, wherein said solid lubricant comprises scaly graphite.

8. The coating agent according to claim 5, wherein said binder comprises a urethane resin.

9. The coating agent according to claim 8, wherein said binder comprises a polyol polyester-based urethane resin.

10. The coating agent according to claim 5, wherein said binder comprises a polyamidoimide resin.

11. The coating agent according to claim 5, wherein said binder comprises an epoxy resin.

12. The coating agent according to claim 11, wherein said binder comprises bisphenol A-type liquid epoxy resin.

13. The coating agent according to claim 5, wherein said binder comprises an aromatic polyamide resin.

14. The coating agent according to claim 5, wherein said binder comprises an acryl resin.

15. The coating agent according to claim 2, wherein said coating film contacts a water repellant-treated glass surface.

16. The coating agent according to claim 4, wherein said coating film contacts a water repellant-treated glass surface.

17. A wiper blade rubber having a coating film on both surfaces of a lip part, said coating film constituting a part which contacts a glass surface to be wiped, said coating film comprising a particulate solid lubricant and a binder and said binder having a 0.5% modulus of 1 MPa or more and an elongation to break of 1% or more.

18. The wiper blade rubber as claimed in claim 17, which is produced by a method comprising applying a coating agent on both surfaces of the lip part of a tandem-shaped wiper blade rubber, drying or curing said coating agent and cutting the distal end of the lip part to form coating films terminating on the lateral surface of the lip part.

19. The wiper blade rubber as claimed in claim 17, wherein said coating film has a thickness of 2 to 10 μm.

20. The wiper blade rubber as claimed in claim 17, wherein when the terminal voltage of a motor for driving the wiper blade rubber is 7 V, the coefficient of static friction with a glass subjected to a water-repellent treatment is 0.65 or less.

21. The wiper blade rubber as claimed in claim 17, wherein the volume ratio of said solid lubricant to said binder is from 0.25 to 1.0.

22. The wiper blade rubber as claimed in claim 17, wherein the volume ratio of said solid lubricant to said binder is from 0.4 to 0.7.

23. The wiper blade rubber as claimed in claim 17, wherein said solid lubricant comprises graphite particles.

24. The wiper blade rubber as claimed in claim 17, wherein said binder is selected from the group consisting of urethane resins, polyamidemide resins and epoxy resins.

25. The wiper blade rubber as claimed in claim 17, wherein said binder has a 0.5% modulus of 4 MPa or more and an elongation to break of 2% or more after drying or curing.

26. The wiper blade rubber according to claim 23, wherein said solid lubricant comprises scaly graphite.

27. The wiper blade rubber according to claim 24, wherein said binder comprises a urethane resin.

28. The wiper blade rubber according to claim 27, wherein said binder comprises a polyol polyester-based urethane resin.

29. The wiper blade rubber according to claim wherein said binder comprises a polyamidoimide resin.

30. The wiper blade rubber according to claim 24, wherein said binder comprises an epoxy resin.

31. The wiper blade rubber according to claim 30, wherein said binder comprises bisphenol A-type liquid epoxy resin.

32. The wiper blade rubber according to claim 24, wherein said binder comprises an aromatic polyamide resin.

33. The wiper blade rubber according to claim 24, wherein said binder comprises an acryl resin.

34. The wiper blade rubber according to claim 26, wherein said coating film contacts a water repellant-treated glass surface.

35. The wiper blade rubber according to claim 23, wherein said coating film contacts a water repellant-treated glass surface.

36. A method for producing a wiper blade rubber, comprising applying a coating agent on two surfaces of a lip part of the tandem-shaped wiper blade rubber, drying or curing said coating agent and cutting the distal end of the lip part to form a coating film terminating on a lateral surface of the lip part, wherein said coating agent comprises a particulate solid lubricant and a binder and said binder has an elastic 0.5% modulus of 1 MPa or more and an elongation to break of 1% or more.

37. The method as claimed in claim 36, wherein the step of drying or curing said coating agent is a step of heat-treating said coating agent under conditions not more severe than 120° and 30 minutes.

* * * * *

UNITED STATES PATENT AND TRADEMARK OFFICE
CERTIFICATE OF CORRECTION

PATENT NO. : 6,696,391 B2
DATED : February 24, 2004
INVENTOR(S) : Shinya Goto et al.

It is certified that error appears in the above-identified patent and that said Letters Patent is hereby corrected as shown below:

Title page,
Item [30], Foreign Application Priority Data, "Jul. 5, 2001" should be -- Jul. 5, 2000 --

Column 11,
Line 13, "claim 2" should be -- claim 7 --
Line 30, "10 $\mu$n" should be -- 10 $\mu$m --
Line 46, "polyamidemide" should be -- polyamideimide --

Column 12,
Line 13, after "claim" insert -- 24 --
Line 14, "polyamidoimide" should be -- polyamideimde --

Signed and Sealed this

Fifth Day of July, 2005

JON W. DUDAS
*Director of the United States Patent and Trademark Office*